March 25, 1941.  A. MACKOWIAK  2,236,437
WHEEL HANDLING CARRIAGE
Filed Sept. 6, 1938  2 Sheets-Sheet 1
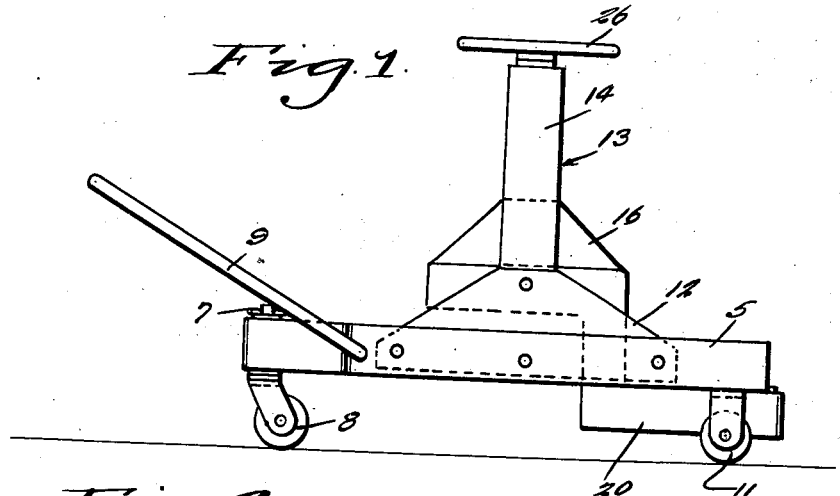
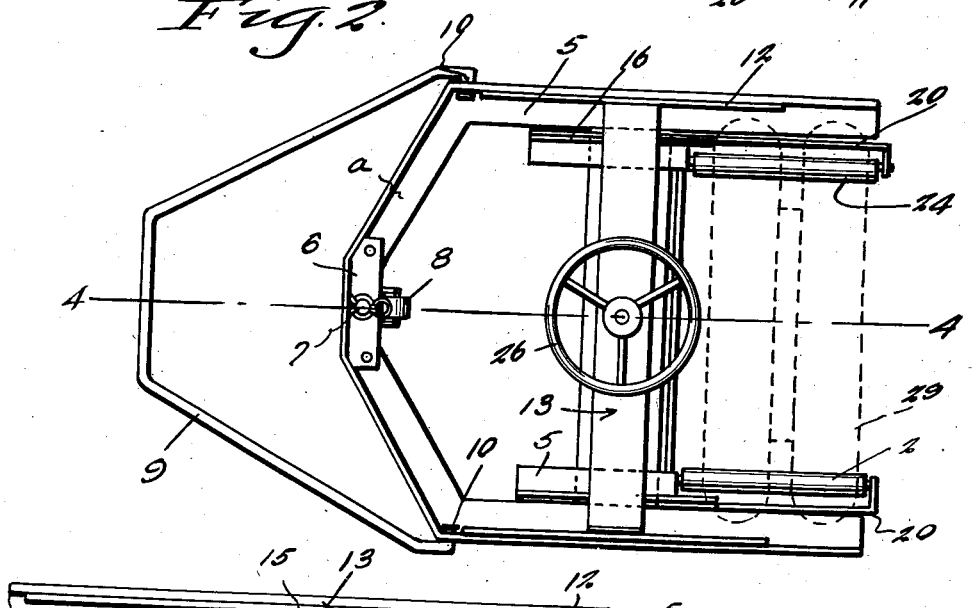
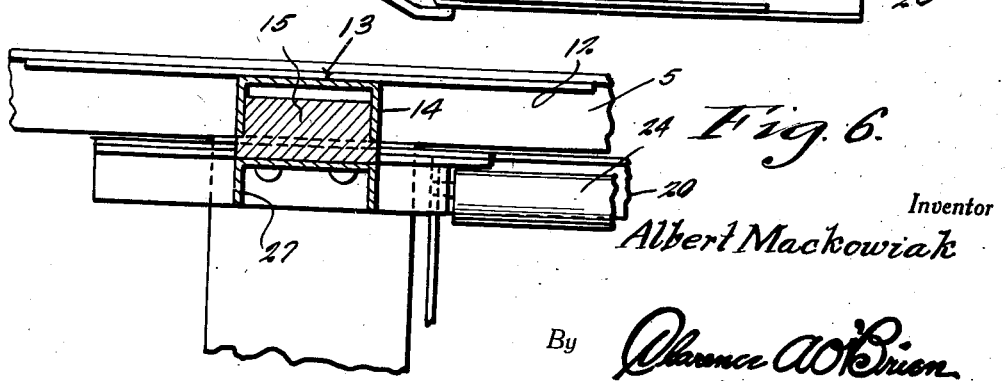
Inventor
Albert Mackowiak
By Clarence A. O'Brien
and Hyman Berman
Attorneys March 25, 1941.                A. MACKOWIAK                 2,236,437
                           WHEEL HANDLING CARRIAGE
                           Filed Sept. 6, 1938         2 Sheets-Sheet 2

Inventor
Albert Mackowiak

By Clarence A. O'Brien
and Hyman Berman
                Attorneys

Patented Mar. 25, 1941

2,236,437

UNITED STATES PATENT OFFICE 2,236,437

WHEEL HANDLING CARRIAGE

Albert Mackowiak, Crookston, Minn.

Application September 6, 1938, Serial No. 228,631

2 Claims. (Cl. 254—2)

This invention appertains to new and useful improvements in carriages for handling heavy loads and more particularly to a wheeled carriage for permitting the easy removal and replacement of heavy duty wheels, when they must be removed and replaced on trucks, truck trailers and the like. These wheels weigh many pounds and require excruciating effort on the part of the mechanic in handling the same, and it is the principal object of the present invention to provide means whereby these large and heavy duty wheels can be handled in an easy and convenient manner, not only saving the energy of the workmen but also saving time.

Another important object of the invention is to provide an instrument of the character stated which can be easily handled and which will be durable and positive acting in operation.

These and various other important objects and advantages of the invention will become apparent to the reader of the following specification.

In the drawings—

Figure 1 represents a side elevational view.

Figure 2 is a top plan view.

Figure 3:
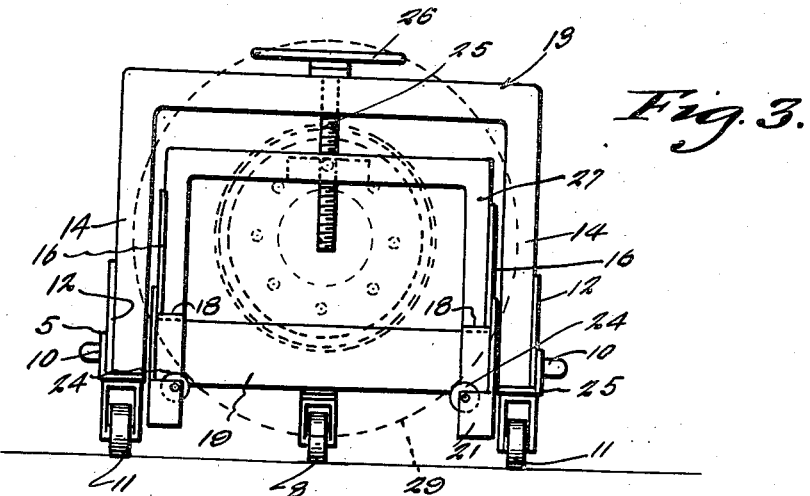

Figure 3 a rear elevational view.

Figure 4:
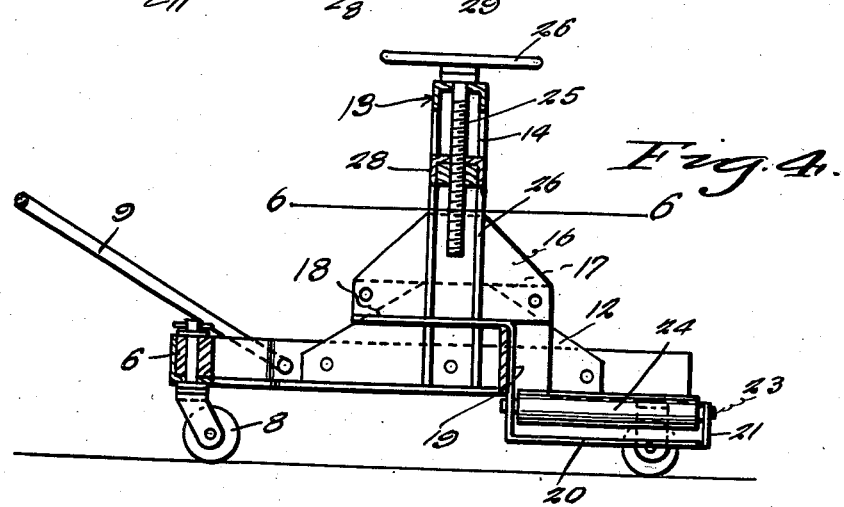

Figure 4 is a longitudinal sectional view on the line 4—4 of Figure 2.

Figure 5:
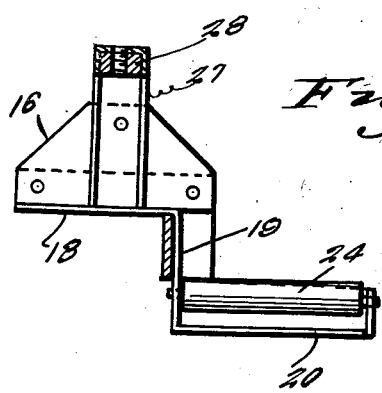

Figure 5 is a vertical sectional view through the platform.

Figure 6 is a fragmentary enlarged section view on the line 6—6 of Figure 4.

Referring to the drawings, wherein like numerals designate like parts, it can be seen that numeral 5 represents a horizontal frame of angle iron construction, one flange of which is disposed upwardly. The bight portion $a$ is of substantially V-shape and at its apex portion is secured the block 6, upwardly through which extends the spindle 7 of the cast wheel unit 8.

A bail-like hand bar 9, substantially of U-shape, has inwardly disposed trunnions 10 at its end disposed into openings in the side portions of the frame 5. Thus the bail-like hand bar 9 is swingably connected to the frame.

The free end portions of the leg portions of the frame 5 have roller units 11 secured to the under side thereof.

To the inner side of the upstanding flange of each leg portion of the frame 5 is fastened an upwardly tapering plate 12 and secured to the inner side of this plate and extending above the same is the corresponding depending leg portion of the inverted U-shaped frame generally referred to by numeral 13. This frame 13 is of channeled construction, the leg portions 14 of which have their channeled sides opposed and adapted to receive the blocks 15 which are vertically slidable in the leg portions 14. Wing members 16 extend from these blocks 15 and to the outer side portions of these wing members 15 are secured the upstanding end flanges 17 of the platform 18 which has a downwardly extending portion 19 merging with the horizontally extending arms 20, the rear or free end portions of which are bent upwardly as at 21 and apertured as is the portion 19 to receive the shafts or trunnions 23 of the rollers 24. These rollers are disposed in parallel relation, as suggested in Figures 2 and 4 and serve to support either a single or a dual type wheel as suggested in Figure 3.

The smooth portion of a screw shaft 25 extends downwardly through the upper portion of the frame 13 and this shaft has the hand wheel 26 at its upper end. The apparatus further includes an inner inverted U-shaped frame 27, in the horizontal portion of which is located the block 28 which has a threaded bore therethrough for receiving the screw shaft 25.

Obviously, by rotating the wheel 26 the platform 18 and the roller assembly 24 can be elevated or lowered to permit proper placement of the rollers under the wheels or wheel 29.

Obviously, when the rollers have been properly engaged under the wheel or wheels to be removed, a slight elevation of the rollers by rotating the screw 25 will result in the taking of the complete load of the wheel or wheels by the carriage, so that by pulling the carriage away from the vehicle the wheel or wheels are completely detached from the vehicle.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is—

1. An implement of the character described comprising a carriage-like structure, said structure including a horizontally disposed substantially U-shaped chassis frame, a super-structure including vertically disposed side members, a vertically slidable structure between the said side members, said super-structure spanning the leg portions of the chassis frame, laterally disposed arms on the slidable structure, said arms being underslung to a level below the said slidable structure and being operative with the slidable structure below, between and above the free end portions of the U-shaped chassis frame.

2. An implement of the character described comprising a carriage-like structure, said structure including a horizontally disposed substantially U-shaped chassis frame, a super-structure including vertically disposed side members, a vertically slidable structure between the said side members, said super-structure spanning the leg portions of the chassis frame, laterally disposed arms on the slidable structure, said arms being underslung to a level below the said slidable structure and being operative with the slidable structure below, between and above the free end portions of the U-shaped chassis frame, and a roller mounted on each of the arms and extending longitudinally thereof.

ALBERT MACKOWIAK.